(No Model.) 9 Sheets—Sheet 1.
J. PINE.
MOWING MACHINE.

No. 420,098. Patented Jan. 28, 1890.

WITNESSES
Geo. A. Darby
Charles S. Baintwall

INVENTOR
James Pine
by W. E. Hagan his Atty (No Model.)  9 Sheets—Sheet 2.
J. PINE.
MOWING MACHINE.

No. 420,098.  Patented Jan. 28, 1890.

WITNESSES
Geo. A. Darby
Charles S. Bruntnall

INVENTOR
James Pine
by W. E. Hagan his atty (No Model.) 9 Sheets—Sheet 3.
J. PINE.
MOWING MACHINE.

No. 420,098. Patented Jan. 28, 1890.

WITNESSES: INVENTOR (No Model.) 9 Sheets—Sheet 4.

J. PINE.
MOWING MACHINE.

No. 420,098. Patented Jan. 28, 1890.

Witnesses
Wm Musser
P. W. Sommers

Inventor
James Pine.
By his Attorney
W. E. Hagan (No Model.) 9 Sheets—Sheet 5.
J. PINE.
MOWING MACHINE.
No. 420,098. Patented Jan. 28, 1890.
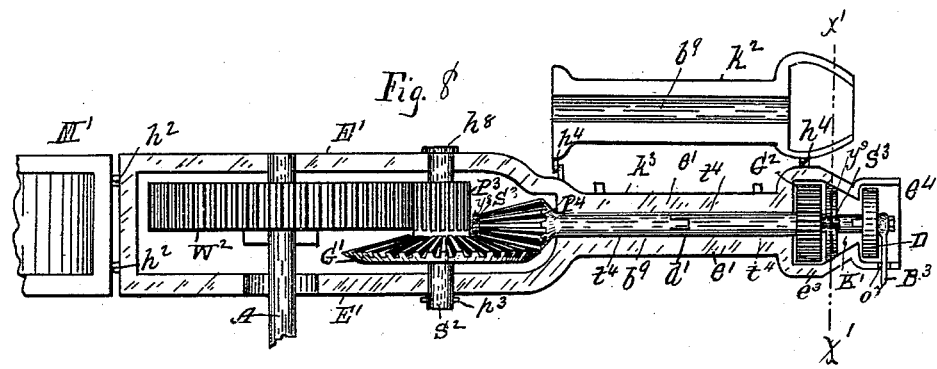
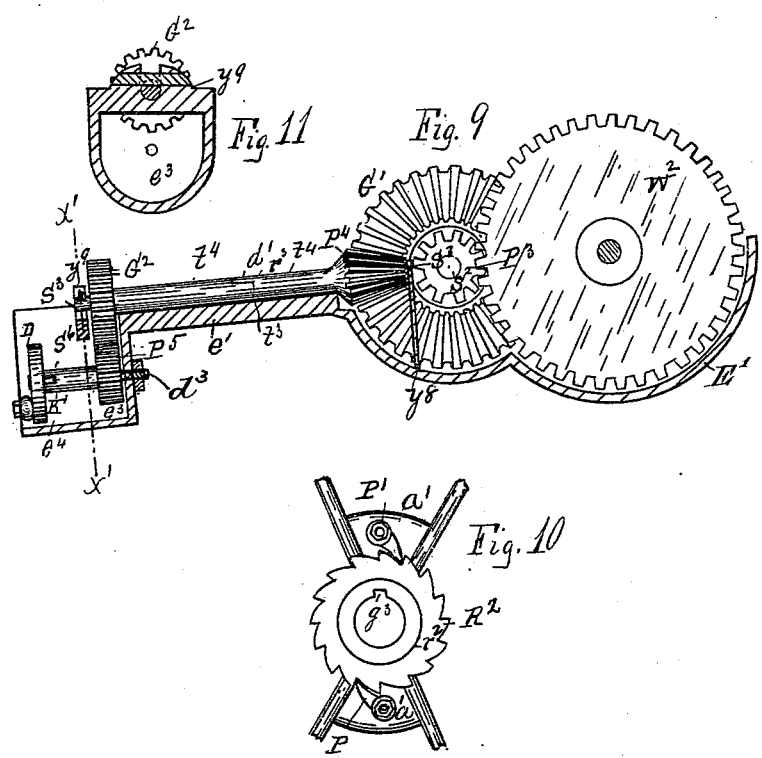
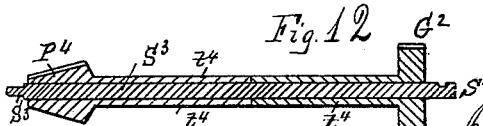
WITNESSES
Geo. A. Darby
Charles D. Bruntnall
INVENTOR
James Pine
by W. E. Hagan his atty (No Model.) 9 Sheets—Sheet 6.
J. PINE.
MOWING MACHINE.
No. 420,098. Patented Jan. 28, 1890.
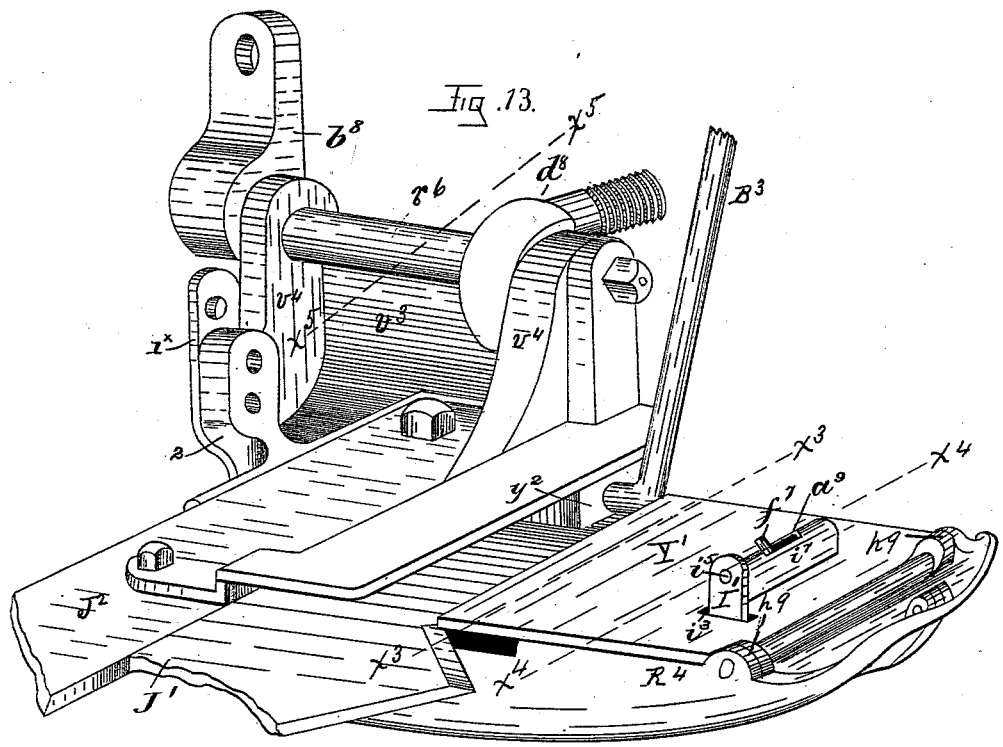
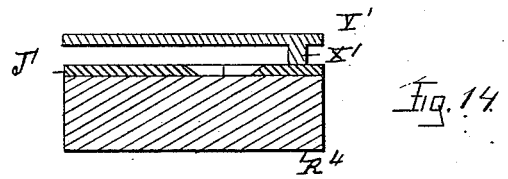
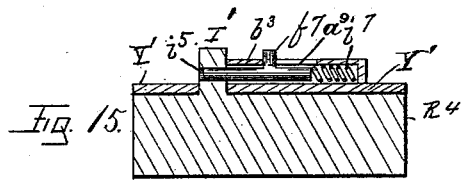
WITNESSES
Oscar A. Michel,
Charles S. Brintnall
INVENTOR
James Pine
by W. E. Hagan Atty (No Model.) 9 Sheets—Sheet 7.

J. PINE.
MOWING MACHINE.

No. 420,098. Patented Jan. 28, 1890.

WITNESSES
Geo. A. Darby
Charles D. Buntrall

INVENTOR
James Pine
by W. E. Hagan his atty

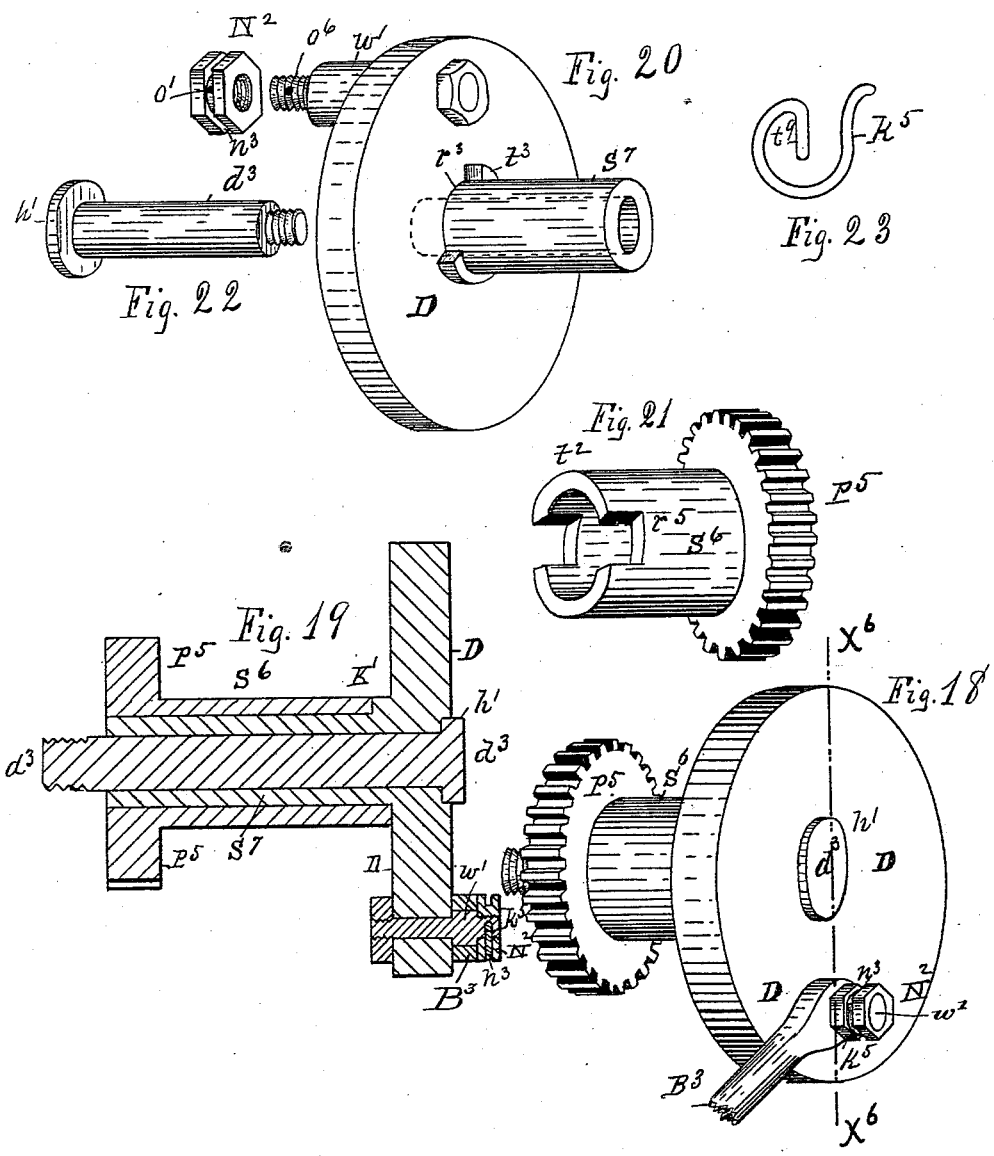

(No Model.)

9 Sheets—Sheet 9.

J. PINE.
MOWING MACHINE.

No. 420,098. Patented Jan. 28, 1890.

WITNESSES
Oscar A. Michel
Charles S. Brimhall

INVENTOR
James Pine by
W. E. Hagan atty

UNITED STATES PATENT OFFICE.

JAMES PINE, OF TROY, NEW YORK.

MOWING-MACHINE.

SPECIFICATION forming part of Letters Patent No. 420,098, dated January 28, 1890.

Application filed June 19, 1886. Serial No. 205,605. (No model.)

*To all whom it may concern:*

Be it known that I, JAMES PINE, of the city of Troy, county of Rensselaer, State of New York, have invented new and useful Improvements in Mowing-Machines, of which the following is a specification.

My invention relates to improvements in mowing-machines; and the object and purpose of my invention and improvement are to better adapt such devices to the uses for which they are designed.

Accompanying this specification, to form a part of it, there are nine plates of drawings, containing twenty-four figures illustrating my invention, with the same designation of parts by letter reference used in all of them.

Figure 1:
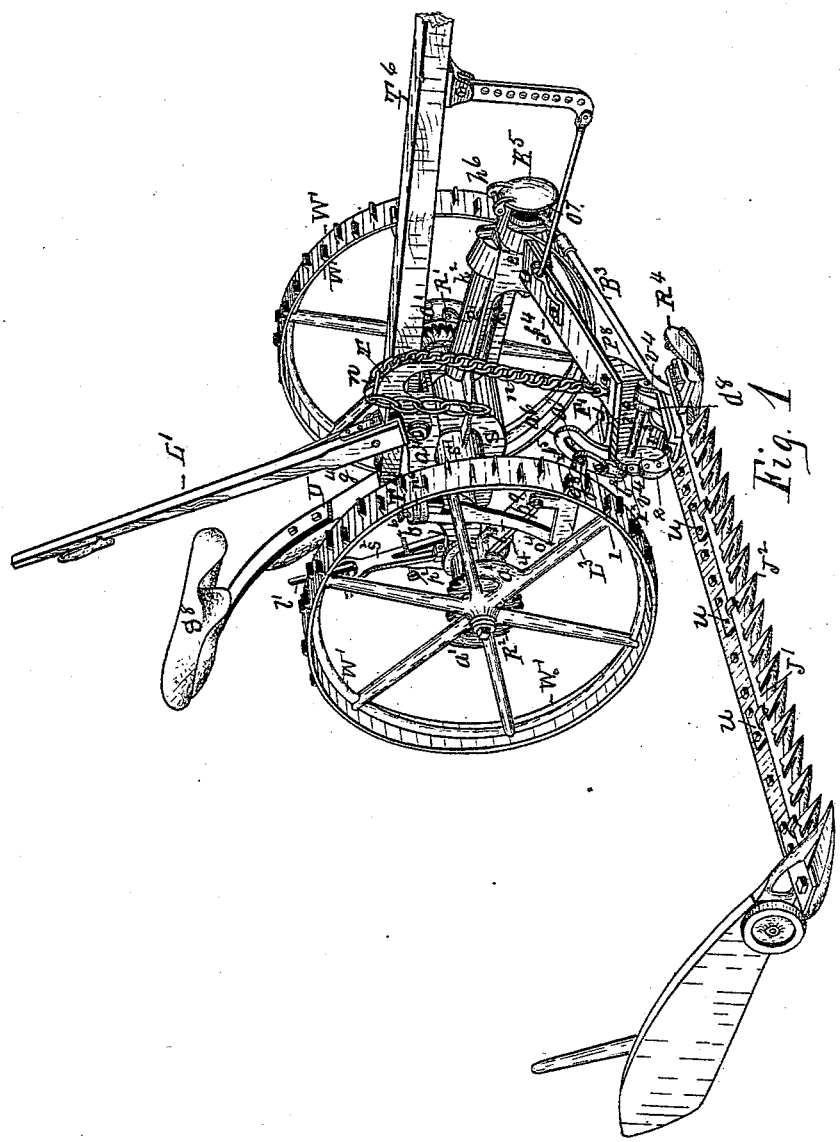
Figure 2:
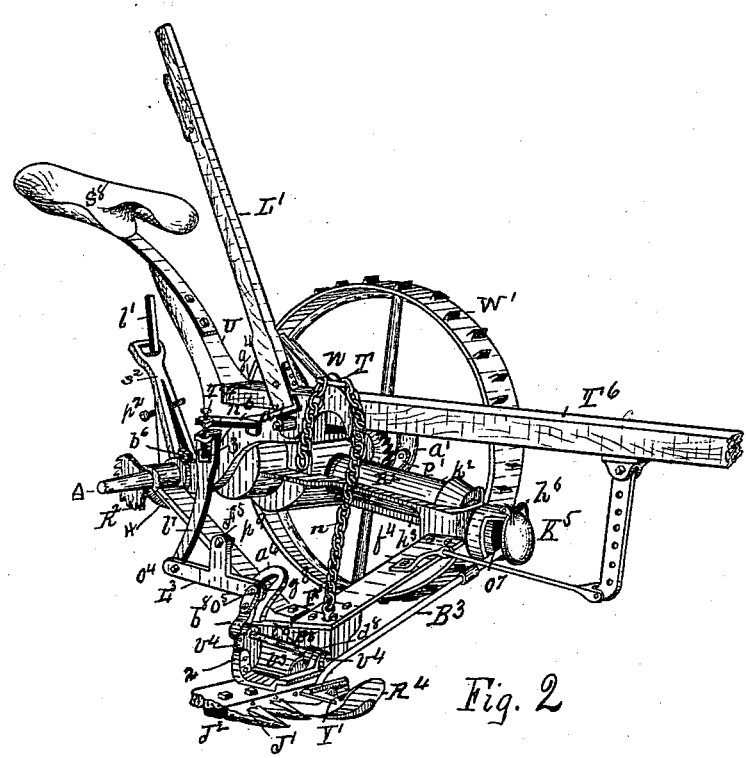
Figure 3:
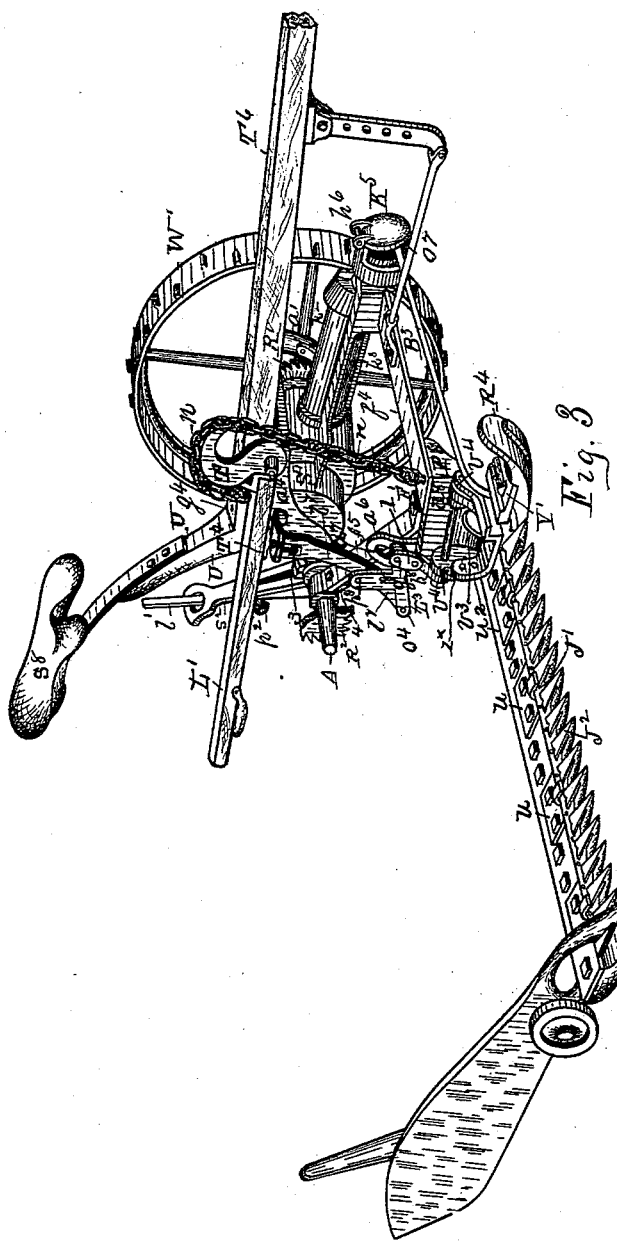
Figure 4:
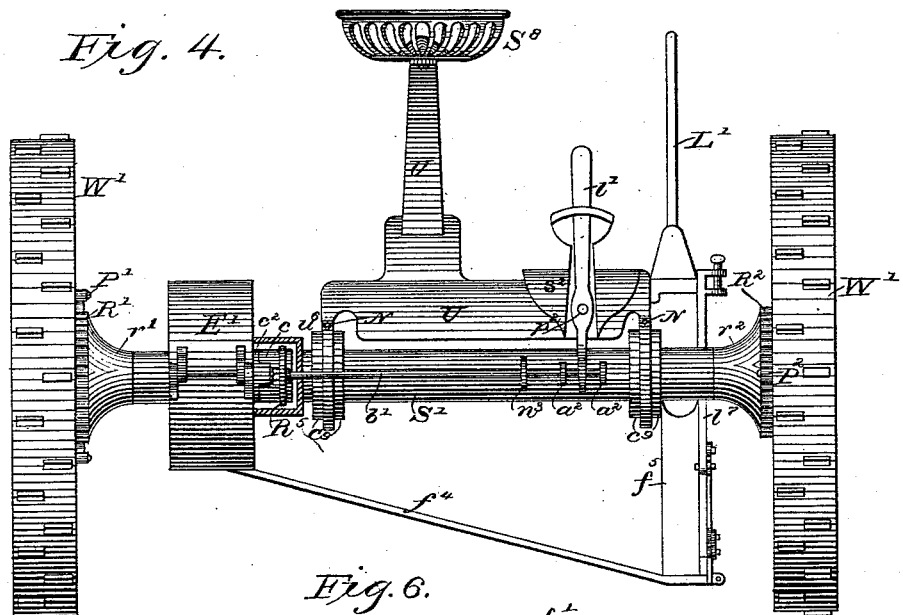
Figure 6:
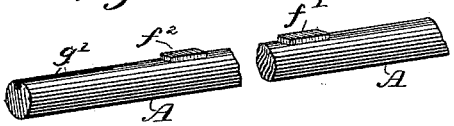
Figure 5:
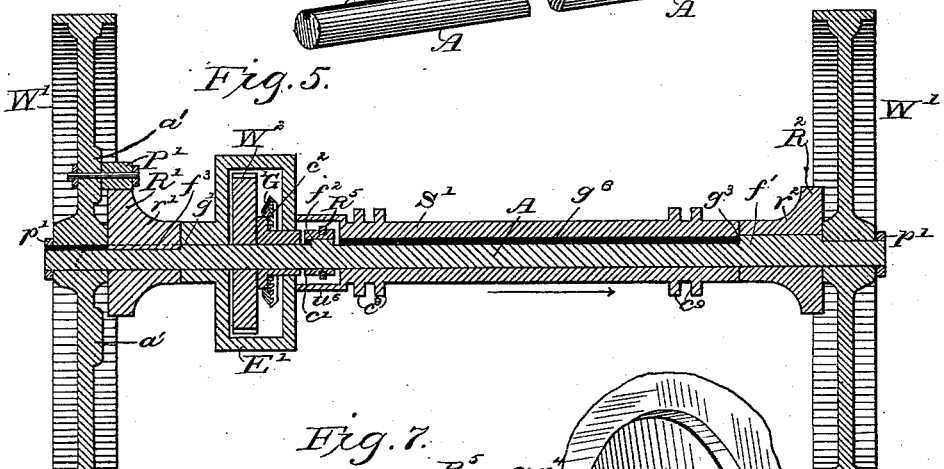
Figure 7:
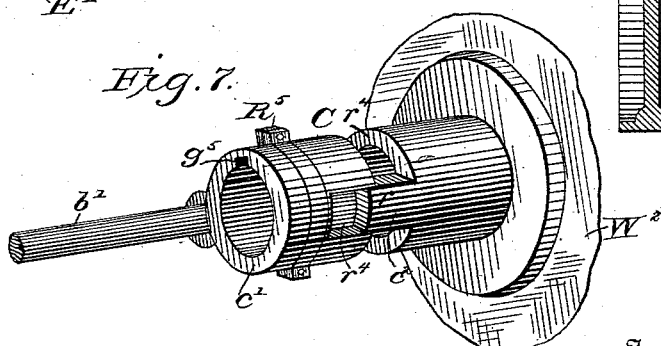
Figure 16:
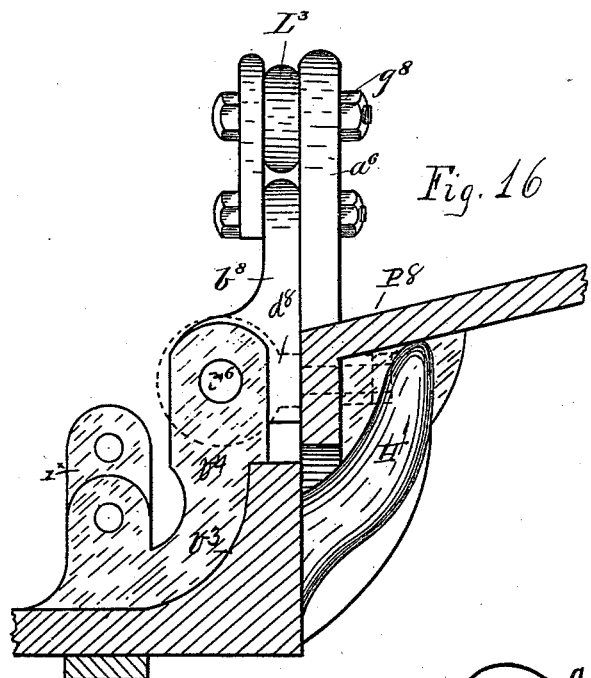
Figure 17:
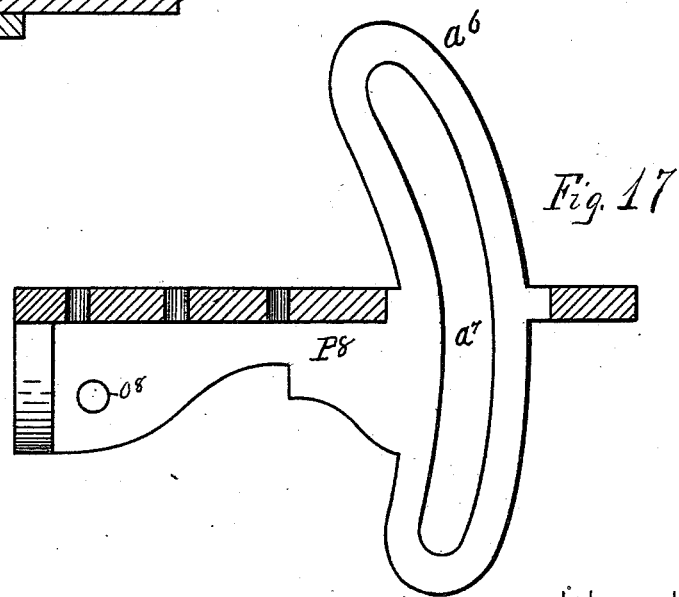
Figure 24:
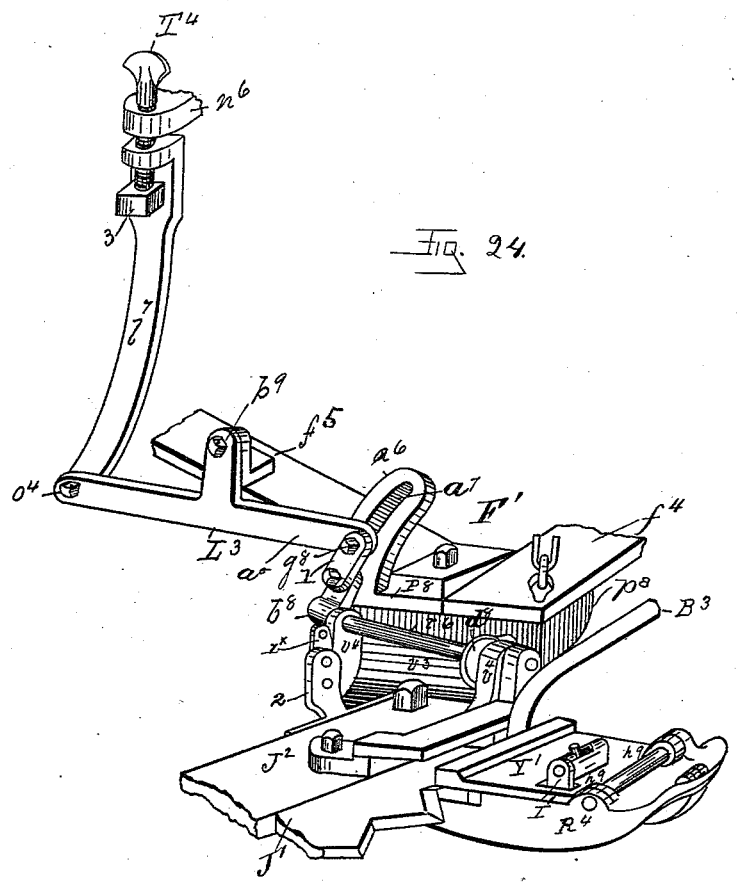

Of the illustrations, Figure 1 is a perspective of a mowing-machine containing my invention and improvements. Fig. 2 is another perspective of the same machine, but shown in this illustration with one wheel removed, and with a part of one of the ratchet-wheels and a part of the cutting mechanism broken out. Fig. 3 is a perspective of the machine, shown with the frame raised up so as to bring the cutting mechanism from off the ground. Fig. 4 is a rear end elevation of the mowing-machine shown at Figs. 1, 2, and 3. Fig. 5 is a vertical section taken centrally through the driving-wheels, axle, axle-sleeve, clutch, and connected motor gear-wheel. Fig. 6 is a perspective of the axle, illustrated as detached, and with a part of its center broken out. Fig. 7 is a perspective of the sleeved clutch arranged on the machine-axle for connecting the latter with the mechanism operating the cutting mechanism. In this representation the lever which operates the sliding bar of the clutch is omitted. Fig. 8 is a top view of an inclosure containing the mechanism which receives power from the axle and transmits it to the cutting mechanism, with the hinged covers of the connected inclosures shown as raised. Fig. 9 represents the same mechanism that is shown at Fig. 8; but in this illustration it is shown in side elevation with a part of the downward extension of the inclosure, and the supports for the longitudinally-arranged shafts therein placed shown in section. Fig. 10 is an enlarged representation of one of the ratchet-wheels and pawls and the arrangement of their parts with reference to the wheels. Fig. 11 is a cross-section taken on the line $x'\,x'$ through the body part of the mechanism shown at Figs. 8 and 9, showing the rod on which the tube-form shaft that operates the pitman disk-wheel turns, but with the said shaft and the cover of the body part thereat omitted. Fig. 12 shows a longitudinal central section of a two-part tubular shaft and its end gears, that are illustrated in position at Figs. 8 and 9, but in this section shown as detached from their connection. Fig. 13 is a perspective of the cutting-mechanism shoe, part of the cutting mechanism, and the connection made with the latter and the pitman, the parts in this figure being shown in a larger proportion than in the other figures. Fig. 14 is a section taken on the line $x^3\,x^3$ of Fig. 13. Fig. 15 is a section taken on the line $x^4\,x^4$ of Fig. 13. Fig. 16 is a combined vertical section and elevation of the shoe, with the sectional part taken on the line $x^5\,x^5$ of Fig. 13. Fig. 17 is a side elevation of a detached plate on which, when in position, the shoe pivots at its side. Fig. 18 shows as separated from the other mechanism the gear-wheel which communicates motion to the pitman disk-wheel and the connection with the pitman. Fig. 19 shows a longitudinal vertical section taken on the line $x^6\,x^6$ of Fig. 18. Figs. 20, 21, and 22 show in perspective and as separated the same parts that are illustrated connectedly at Figs. 18 and 19. Fig. 23 illustrates the form of the pitman-nut keeper. Fig. 24 is a perspective of the shoe, the mechanism by which the latter is hinged to and pivoted on the machine-frame, and the lever by which the front end of the shoe is raised or depressed, with the parts shown in larger proportion than in the other figures where represented.

The several parts of the mechanism thus illustrated are designated by letter reference, and the function of the parts is described as follows:

The letters W' designate the wheels, and A the axle, the latter having at one end the groove $g'$, at the opposite end the feather $f'$, and intermediately the clutch-feather $f^2$.

The letter R' designates a ratchet-wheel having a hub $r'$, made with a central passage for the axle A, and $f^3$ indicates a feather made on this hub interior to enter the groove $g'$ of the axle.

The letter $g^6$ designates a groove made in the axle-sleeve.

The letter $R^2$ indicates another ratchet-wheel having a hub $r^2$, also constructed with a central passage for the axle A, with a groove $g^3$ made in its axle-passage to receive the feather $f'$ on the axle. These ratchet-wheels at their opposite locations upon the axle ends are so made that one of them shall have a feather made to enter a groove in the axle, and the other made with a groove to receive a feather upon the axle end, and the sleeve S' is made with the groove $g^6$, so that when the machine is to be taken apart to be stored away the axle A may be drawn out from the wheels in the direction indicated by an arrow, the groove in the sleeve allowing the feather $f'$ of the clutching mechanism to pass when this is being done.

The letters P' P' and P² P² designate pawls pivoted to pieces $a'$, arranged oppositely on the wheels W', between the spokes thereof. These pawls, as the wheels are turned in moving the machine over the ground frontwardly, engage with the ratchets to turn the latter and the axle; but when the machine is backed, then the pawls overrun the teeth of the ratchets and do not move the axle, the wheels turning freely on the latter.

The letters $p'$ designate nuts arranged in the ends of the axles to keep the wheels in place on the axle.

The letters C designate a two-part clutch, both of which of its parts are sleeved onto the axle and arranged within the enlargement $w^6$ of the sleeve S', and each of which clutch parts are respectively designated at $c'$ and $c^2$. The adjacent ends of these two parts of the clutch are made to tongue into each other by means of teeth $r$ and recesses $r^4$, made in each of them. The part $c^2$ of the clutch where sleeved onto the axle is secured to the inner face of the main motor-wheel W² to turn with it, and adapted (when not connected with the other part of the clutch) to have the axle turn freely therein. The part $c'$ of the clutch, where sleeved onto the axle, is constructed with a groove $g^5$, adapted to receive a feather $f^2$, made on the axle, so that this part of the clutch always turns with the axle.

The letter $b'$ designates a horizontally-arranged bar provided with a guide $n^3$, through which latter it passes, said guide being attached to the sleeve S' at the rear of the latter. This bar $b'$ connects with a ring or fork $R^5$, arranged on the untoothed end of the clutch part $c'$, so that the latter can turn in said ring or fork. Upon this bar $b'$ there are two collars $a^2$ $a^2$, arranged a short distance apart.

The letter $l'$ designates the clutch-lever, which is pivoted to a standard $s^2$ at $p^2$, with its lower end looped around or made forked, so as to straddle the bar $b'$ between the collars $a^2$. This lever $l'$ is arranged at the right hand of the driver's seat S⁸ and a little in front of the latter. As thus constructed, when the lever $l'$ is pushed out toward the adjacent wheel, it moves the bar $b'$ laterally, and by means of the ring or fork $R^5$ on the clutch part $c'$, with which said bar connects, it forces said clutch part $c'$ to engage with the clutch part $c^2$, and thus communicates motion to the wheel W², that in turn transmits power to the other mechanism, as will be subsequently described.

The letter P³ (see Figs. 8 and 9) designates a pinion arranged on the pintle-shaft S² so as to turn thereon and mesh into the gear-wheel W², said pintle-shaft at its ends being secured in the sides of the inclosure E' by means of a head $h^3$ upon one of its ends and a securing-pin $p^3$, that passes through the other end, outside of the inclosure-wall.

The letter G' indicates a beveled gear-wheel cast in connection with the pinion P³, that is also arranged to turn on said shaft S² with the latter. The rigid shaft S³ has its rear-end support in the stud $y^3$ and its front-end support in the bar $y^9$. The beveled pinion P⁴ has a tube-form two-part shaft $t^4$, that encircles the rigid shaft S³, and which tubular shaft moves with said pinion P⁴ on the said rigid shaft S³; and the letter G² designates a gear-wheel on the front end of the tubular two-part shaft.

The letter $d'$ designates a toothed coupler-connection, by which the two parts of the tubular shaft $t^4$ are connected, as shown at Figs. 8, 9, and 12. The purpose of thus arranging the rigid shaft S³ and the two-part tube-form shaft $t^4$ is to facilitate their removal when it is desired to take the machine apart.

The letters $r^3$ designate recesses, and $t^3$ teeth formed in the adjacent coupler ends of the two-part tubular shaft.

The gear-wheel G², arranged on the outer end of the tubular shaft $t^4$, receives power as the two-part tubular shaft $t^4$ is rotated by the beveled pinion P⁴, and this gear-wheel G² meshes into the pinion P⁵, that is arranged on the tubular shaft S⁶ of the pitman disk-wheel D, said tubular shaft turning with the sleeved shaft S⁷, and the latter on the fixed shaft or pin $d^3$, the latter being made with the head $h'$ and adapted to screw into the rear vertical wall of the downcast inclosure $e^3$. This tubular shaft S⁶ is made with a clutch K', formed by means of the teeth $t^3$ and recesses $r^3$ on the inner face of the pitman disk-wheel D and the teeth $t^2$ and recesses $r^5$ on the outer end of said tubular shaft.

The inclosure E' is made to extend rearwardly beyond the axle A far enough to house in the rear part of the wheel W² and frontwardly far enough to house in that portion of the said wheel W² that is in advance of the axle, and also the pinion P³, the beveled gear-wheel G', and the beveled pinion P⁴.

The letter M′ designates a cover that is hinged to the rear end of the inclosure E′, as indicated at $h^2$.

The letter $e'$ indicates an inclosure that connects with the inclosure E′ and is frontwardly projected therefrom. This inclosure $e'$ is made to house in the rigid shaft $S^3$ and to furnish a passage-way $b^9$ for the tubular-form two-part shaft $t^4$, and is then enlarged laterally and downwardly at $e^3$ to house in and contain the gear-wheel $G^2$ and the pinion $P^5$, this inclosure $e'$, where containing the rigid shaft $S^3$ and two-part tubular-form shaft $t^4$, being laterally and longitudinally divided, so as to produce the body part $k^3$ and cover part $k^2$, which two parts are hinged together at $h^4$. Frontwardly of the inclosure $e^3$ is another inclosure $e^4$, connecting with the inclosure $e^3$, which on its front face is constructed with a cap $K^5$, that is hinged to the body part at $h^6$; and the letter $o^7$ designates a slot made in the side of said inclosure $e^4$ for the reciprocating movement of the pitman.

As the wheel $W^2$, pinion $p'$, beveled gear-wheel G′, beveled pinion $P^2$, rigid shaft $S^3$, tubular two-part shaft $t^4$, pinion $P^5$, and the pitman disk-wheel D and its connections are arranged within the inclosures E′, $e'$, $e^3$, and $e^4$, by removing the nuts from the axle A the latter can be drawn out, and by removing the shaft $S^3$ and shaft $S^2$ one or all of the motor factors contained within said inclosures can be removed and duplicated and replaced with ease and without the necessity of skilled labor.

The letters F′ designate the frame, which is composed of the two parts $f^4$ and $f^5$, that are arranged at right angles to each other, and at the angle are each connected to the bracket $P^8$, to which the shoe and cutting mechanism are connected, as hereinafter specified. If desired, the parts $f^4$ and $f^5$ and bracket $P^8$ may be made in one piece. The frame part $f^5$ at its rear end is attached to a plate 4, projected from the sleeve S′, arranged upon the axle A, and the frame part $f^4$ at its outer end is connected with the adjacent wall of the inclosure $e'$.

The letter L′ designates a lever which is attached to the outer end of a frontwardly-projected segmental turn-lever T, that is pivoted at its rear end to an arm $a^4$, with the latter at its rear end connected to the axle-sleeve at $b^6$, Fig. 1, and which arm therefrom curves upwardly and frontwardly.

The letter $n$ designates a chain, one end of which is attached to the inner end of the segmental turn-lever T, and is passed over the latter and extended downwardly to attach to the frame F′. When the lever L′ is moved rearwardly, the frame F′ is raised thereby.

The letter $R^4$ designates the shoe to which the finger-bar is attached, and whereat the connection between the pitman and the cutter-bar is made. This shoe is constructed with an upturned front end, and at its side nearest the frame with a curved plate $v^3$, having projecting ears $v^4$ $v^4$, and vertically-arranged standards or lugs $1^x$, to which the standard or lug 2 on the rear of the shoe is connected, as best shown in Fig. 13 of the drawings. The letter $r^6$ designates a hinging-rod arranged to pass through these ears. The letter $P^8$ indicates a bracket consisting of a flat top piece or plate having downward-extending sides, as shown in the drawings. This bracket is secured on the frame F′ at the intersection of the frame-pieces, and is intended to support the shoe and cutting mechanism. At the inner end of the bracket $P^8$ is formed an arm $a^6$, projected upward and curved inward and having a curved slot $a^7$. In the side of the bracket $P^8$ is a bolt-hole $o^8$, in which is arranged a bolt $d^8$, having a threaded stem provided with a nut to hold it in place, and at the outer end is formed with an eye to take and hold the hinge-rod $r^6$, to which the shoe is swung and turns. The shoe, being thus connected to the frame F′ by the bracket and bolt, may be raised and lowered through the operation of the lever L′, connected to the frame. It will also be perceived that the movements imparted to the shoe raise and lower the connected cutting mechanism.

The letter H′ designates a horn-form projection that is constructed or cast on the inner side of the shoe, and therefrom is extended out under the plate $P^8$, so as to engage with the under side of the latter when the frame F′ is raised, and thus the outer ends of the cutter-bar and finger-bar are held up from off the ground.

The letter $L^3$ designates a lever that is centrally, between its ends, pivoted at $p^9$ to the frame part $f^5$. The rear end of this lever, as indicated at $o^4$, is pivoted to a bar $l^7$, and the latter at its upper end is tapped and threaded to receive a set-screw $T^4$. A nut 3 may be arranged on the end of the set-screw to prevent the parts connected from being entirely disengaged.

The letter $n^6$ indicates a bracket that is laterally projected from the arm $a^4$, and into the outer end of which bracket the set-screw $T^4$ works, with its lower end entered into the threaded end of the bar $l^7$. As thus constructed, when the bar $l^7$ is raised vertically by the set-screw, the rear end $o^4$ of the lever $L^3$ is also raised and its front end at $o^5$ is depressed, and when the set-screw is turned in an opposite direction then the rear end of the lever $L^3$ is depressed and its front end raised. The front end $o^5$ of the lever $L^3$ is provided with a guide-pin $g^8$, that moves in a slot $a^7$ of the arm $a^6$ on the bracket $P^8$, and this front end $o^5$ of the said lever carries a link-piece $l$, arranged on the bolt $g^3$, and having its lower end connecting with the shoe by means of a bar $b^8$, that has an eye formed on its lower end, which is hinged onto the rod $r^6$. Through the action of the set-screw and its connection by means of the bar $l^7$ with the lever $L^3$, and the connection of the latter made with the shoe, and the pivoted connection made between the shoe and the frame F' by means of the bolt $d^8$, the front end of the shoe and the teeth of the cutter-bar and fingers of the finger-bar at the front can be inclined upwardly or depressed, as may be desired. As the shoe is thus hinged to the bolt $d^8$, the shoe can be raised or depressed at the front by turning on said bolt $d^8$, and by means of the hinging connection made between the said shoe and the bracket $P^8$ the shoe and connected cutting mechanism can be folded over, so as to rest on the pole. The shoe being supported on the hinge-rod $r^6$ in the bolt $d^8$, arranged in the flange or side of the bracket $P^8$, fixed to the frame F', when the frame F' is lifted by the lever L', the heel of the shoe is also raised, and as the shoe is thus raised the hinged end of the cutters is carried up until the horn H' bears against the under face of the bracket $P^8$, when the whole of the cutting mechanism is lifted free from the ground, as shown in Fig. 3 of the drawings.

The letter J' designates the cutter-bar, and $J^2$ the stationary finger-bar.

The letter $u$ designates the cutter-bar guides, and $y^2$ an eye made in the end of the cutter-bar to receive the inturned end of the pitman $B^3$, this connection between the pitman and cutter-bar being a well-known method of making it.

The letter Y' designates the shoe-cover plate. The letter $h^9$ indicates a hinged connection made between the plate Y' and the shoe, and the letter I' designates a stud that is projected up through the plate Y' by an opening $i^3$, made in said plate Y'. This stud is made with a bolt-passage $i^5$, and the letter $b^3$ indicates a spring-bolt arranged within an inclosure $i^7$ upon the top of the plate Y', said bolt being provided with a finger-piece $f^7$, projected upwardly from the bolt through a slotted opening $a^9$, made in the top of the inclosure $i^7$, by means of which finger-piece the spring-bolt can be moved back from out the stud I' and the plate Y' swung up on its hinged connection. The function of the plate Y', when latched down, is to prevent the inturned end of the pitman, when moving rapidly, from being thrown from out of the eye in the end of the cutter-bar. This hinged plate Y' serves also to cover the sickle end where it moves within the shoe, and by means of the stop-pin X' on its under surface it prevents the sickle from falling out when raised up and being folded back.

The letter $S^8$ designates the seat, and U its support; $c^9$ $c^9$, collars arranged on the sleeve S', and N a strap at each side of the seat-support, arranged to encircle the sleeve S' between each set of said collars $c^9$.

The letter $T^6$ designates the pole, which at $g^4$ is bolted to the seat-support U, so that by means of the said straps the seat-support and pole are hinged onto the axle-sleeve S'.

The letter $k^5$ designates the pitman-nut keeper constructed of tough wire having an e form with the curved inner end made with the straight part $t^9$. This keeper is passed in the groove $n^3$ around the pitman-nut $N^2$, with the straight part of the keeper passed through the opening $o'$ in the nut and $o^6$ in the rigid pintle $w'$, said keeper being sprung into place as thus positioned. The function of this keeper as thus made and applied is to prevent the nut $N^2$ from unscrewing from off the crank-pin $w'$.

The arrangement of the clutch-lever (and the bar which in connection with it moves the clutch) at the right hand and front of the driver's seat is that the driver will not have to change the reins from his left to his right hand to operate the lever, as persons in driving can better use their left hand to hold the reins while they operate the lever with the right hand.

Having thus described my invention, what I claim, and desire to secure by Letters Patent, is—

1. The combination of the gear-wheel $W^2$, adapted to receive motion substantially as described, the pinion $P^3$, arranged to mesh into the former, the beveled gear-wheel G', connected so as to turn with said pinion $P^3$ on the fixed shaft $S^2$, the beveled pinion $P^4$, adapted to mesh into said beveled gear-wheel G', the gear-wheel $G^2$, and the two-part tubular shaft $t^4$, rigidly connected to said gear-wheel $G^2$ and the said beveled pinion $P^4$, said tubular two-part shaft being adapted to turn on the rigid shaft $S^3$, substantially in the manner as and for the purposes set forth.

2. The combination, with the pitman disk-wheel of a mowing-machine, of a pinion adapted to receive power therefrom, a sleeve-form shaft that is provided with an interior bearing, and at one of its ends rigidly connected to so as to turn with said pinion, and at its other end connected to said pitman disk-wheel by means of a coupler-connection, substantially as and for the purposes set forth.

3. In a mowing-machine, the combination, with the pitman disk-wheel D, of the pinion $P^5$, the sleeve-form shaft $S^6$, at one of its ends rigidly attached to so as to turn with said pinion $P^5$, and at its other end making a coupler-connection with said pitman disk-wheel and provided with a bearing on which to turn, the gear-wheel $G^2$, the beveled pinion $P^4$, and the tubular two-part shaft $t^4$, rigidly connected at one of its ends with said beveled pinion $P^4$ and at its other end with the gear-wheel $G^2$, and provided intermediately with a coupler-connection, as and for the purposes set forth.

4. The combination of the pitman disk-wheel D, the pinion $P^5$, the sleeve-form shaft $S^6$, at one of its ends rigidly connected with said pinion $P^5$, and at its other end making coupler-connection with said disk-wheel, the sleeve-form shaft $S^7$, rigidly secured to the pitman disk-wheel and arranged within the sleeve-form shaft $S^6$, and the pintle or shaft $d^3$, provided with a head at one end and a thread and nut at the other end arranged within said inner sleeve-form shaft $S^7$, substantially as and for the purposes set forth.

5. The combination, with the inclosure $e'$, made with the shaft-passage $b^9$ and cover $k^2$, of the tubular two-part shaft $t^4$, having a coupler-connection between its two parts, the beveled pinion $P^4$, arranged on the inner end of said two-part tubular shaft and adapted to receive motion substantially as described, the gear-wheel $G^2$, arranged on the outer end of said two-part shaft, so as to turn with the latter, and the rigid shaft $S^3$, provided with stud-support $y^8$ and bar-support $y^9$, substantially as and for the purposes set forth.

6 The combination, with the wheel D, that operates the pitman of a mowing-machine by means of a wrist-pin, of a sleeved shaft made to connect with said pitman disk-wheel by means of a clutch, and a gear-wheel on the other end of said sleeved shaft adapted to receive power to rotate said sleeved shaft and pitman disk-wheel, substantially in the manner as and for the purposes set forth.

7. The combination of the inclosure E', made with the cover M' hinged to its rear end, the inclosure $e'$, connecting with the front end of the inclosure E', the laterally-enlarged and downwardly-extended front end $e^3$, the cover $k^2$, hinged to the side of the inclosure $e'$, and its enlargement $e^3$, and the end inclosure $e^4$, connecting with the enlargement of the inclosure $e^3$, made with the side slot $o^7$ and having the hinged cap $K^5$, substantially as and for the purposes set forth.

8. The combination of the gear-wheel $G^2$, adapted to receive motion, as described, the pinion $P^5$, adapted to mesh into said gear-wheel $G^2$ and constructed with the toothed-clutch-part sleeve $S^6$, the pitman disk-wheel D, constructed with the toothed-clutch part and sleeve $S^7$, and the pintle-shaft $d^3$, said parts being constructed and arranged to operate substantially as and for the purposes set forth.

9. The combination, with a mowing-machine pitman disk-wheel, of the threaded wrist-pin or bolt $w'$, made with the passage $o^6$, diametrically arranged in its threaded part near its end, of the nut $N^2$, made with the encircling groove $N^3$ and diametrically-arranged passage-way $o'$, and the e-form keeper-spring, constructed and arranged to operate substantially in the manner as and for the purposes set forth.

10. The combination of the shoe $R^4$, made with the hinging-ears $v^4 v^4$, the rod $r^6$, arranged in said ears at its ends, the bracket $P^8$, attached to the angular end of the frame F', said bracket being constructed with the bolt-passage $o^8$ and upturned slotted arm $a^6$, the bolt $d^8$, made with an eye at one end to receive the hinging-rod $r^6$ and at the other end to receive a nut where passed through said bracket $P^8$, and the pivoted lever $L^3$, having a loose and sliding connection with the slotted arm of said bracket and connected to the casting $b^8$ on the end of the bolt $r^6$, all constructed to operate substantially as and for the purposes set forth.

Signed at Troy, New York, this 24th day of May, 1886, in the presence of the two witnesses whose names are hereto written.

JAMES PINE.

Witnesses:
CHARLES S. BRINTNALL,
GEO. A. DARBY.